United States Patent [19]

Natori

[11] Patent Number: 5,348,376
[45] Date of Patent: Sep. 20, 1994

[54] ARRANGEMENT OF HEADREST ON A SEAT

[75] Inventor: Takashi Natori, Akishima, Japan

[73] Assignee: Tachi-S Co., Ltd., Akishima, Japan

[21] Appl. No.: 871,396

[22] Filed: Apr. 21, 1992

[51] Int. Cl.$^5$ .............................................. A47C 7/38
[52] U.S. Cl. .................................. 297/391; 297/396; 248/224.3
[58] Field of Search .............. 297/104, 391, 395, 396, 297/406, 410, 412, 415, 416; 248/224.3, 354.5; 403/378, 379

[56] References Cited

U.S. PATENT DOCUMENTS

| 620,833 | 3/1899 | Belcher et al. | 403/379 X |
|---|---|---|---|
| 1,412,610 | 4/1922 | Foley | 403/379 |
| 2,776,811 | 1/1957 | Schaffer | 248/354.5 X |
| 2,802,519 | 8/1957 | Jeckell et al. | 297/412 |
| 2,872,227 | 2/1959 | Wachs | 403/379 |
| 2,896,621 | 1/1959 | Zukor | 297/410 X |
| 3,157,434 | 11/1964 | Gianvecchio | 297/410 X |
| 4,881,777 | 11/1989 | Dorshimer . | |

FOREIGN PATENT DOCUMENTS

| 158949 | 11/1980 | Japan . | |
|---|---|---|---|
| 30434 | 2/1986 | Japan | 297/410 |
| 90445 | 6/1986 | Japan . | |
| 31449 | 2/1987 | Japan . | |
| 1876 | of 1898 | United Kingdom | 403/379 |
| 659379 | 10/1951 | United Kingdom | 403/379 |

Primary Examiner—Peter R. Brown
Attorney, Agent, or Firm—Oldham, Oldham & Wilson Co.

[57] ABSTRACT

An arrangement of a headrest on a seat, in a type wherein the headrest is supported via one single stay upon a seat back of the seat, the arrangement being such that the lower portion of the stay is fixed via a sleeve element within a bracket upon a seat back frame. The sleeve element passes through the stay in its diameterwise direction and both ends of such sleeve element are abutted against the inner walls of both lateral sections of the bracket, to thereby rigidly accept a strong fastening force of bolts which are used to fix the lower portion of stay to the bracket.

3 Claims, 3 Drawing Sheets

ARRANGEMENT OF HEADREST ON A SEAT

BACKGROUND OF INVENTION

1. Field of the Invention

The present invention relates to a headrest for an automotive seat, and particularly to an arrangement for fixing the headrest upon a seat back of the seat via a single headrest stay which extends from the headrest.

2. Description of Prior Art

In the headrests of a type having a single headrest stay to be fixed on a seat back of a seat, a most typical one is cantilever-type headrest having a generally L-shaped stay whose horizontal stay section extends from one lateral side of the headrest and whose vertical stay section extends continuously from that horizontal stay section downwardly to the upper edge of seat back. Thus, the horizontal stay section is fixed to a base frame of headrest, while the vertical stay section is formed with a pair of through-bores which extend transversely therethrough. Such vertical stay section is firmly fastened to a securing bracket fixed on a right-side or left side corner portion in the upper frame section of seat back frame. In this respect, referring to FIG. 2, which shows an embodiment of the present invention though, one could also see an example of conventional headrest arrangement upon a seat back frame. Using this figure, a brief explanation will be made thereof for better understanding.

Namely, the cantilever-type stay (14) comprises a horizontal stay section (14b) and a vertical stay section (14a). As stated above, the horizontal stay section (14b) is fixed to a headrest base frame (24), and one end portion of that section extend from the lateral wall of headrest (14) to continue with the vertical stay section (14a). The lower end portion of vertical stay section (14a) is fixedly fastened by the securing bracket (18). Let us refer in this respect to FIG. 1, an ordinary conventional securing bracket, like the one (18), is formed to have a channel cross-section, comprising a pair of side sections (like 18a, 18b) each having a pair of holes (like 26, 27) formed therein. Correspondingly to those holes, the lower end portion vertical stay section (14a) is formed with a pair of through-bores (like 14a-1, 14a-2).

With the above basic conventional structure, the stay (14) is fixed upon the upper frame section of seat back frame (16) by way of passing a pair of securing bolts (like 20, 20 in FIG. 1) through both foregoing holes of bracket and through-bores of lower portion of headrest stay vertical section (14a) and fastening them all together.

According to this conventional headrest arrangement on seat back, the lower portion of headrest stay vertical section (14a) is strongly pressed together with the securing bracket by means of the bolts in order to enhance the connecting effect of the stay (14) to the seat back frame (16), thereby avoiding a rattling or wobbling between the stay and bracket.

However, such strong fastening force given from the bolts to both stay lower portion and side sections of bracket results in collapse of the stay lower portion as well as in deformation of both sides of bracket. This is because, in general, the diameter-wise rigidity of the stay at that lower portion is not so great and both side sections of bracket are formed by two relatively thin plate materials respectively, thus being vulnerable to a force applied transversely thereof. Consequently, in that case, the same rattling or wobbling problem will arise again between the stay and bracket, and further there will be a great likelihood that the foregoing holes formed in the bracket may be widened undesirably and the bolts may be cut due to the tendency of the horizontal stay section (14b) to be rotated backwardly about the axis of vertical stay section (14a) by a great backward load given from the head of an occupant to the headrest (12) in a collision case.

To eliminate those drawbacks, a solution may be thought to make greater the thickness of both bracket and stay as well as the diameter of bolts, but another problem will arise, such as a dimensional and weight increase in the headrest construction.

SUMMARY OF THE INVENTION

In view of the foregoing drawbacks, it is thus a purpose of the present invention to provide an improved arrangement of headrest on a seat which strengthens the rigidity between the headrest stay and bracket without increase in weight and dimensions.

To attain this purpose, in accordance with the invention, the headrest arrangement basically comprises a sleeve means which is fixed in the headrest stay, such that the sleeve means passes through the stay in a diameter-wise direction thereof; a bracket means having a generally channel cross-section, which is fixed to the seat back and thus formed with a pair of opposed lateral walls; a pair of holes formed in each of such pair of opposed lateral walls; and a bolt which is inserted through those sleeve means and pair of holes, and fastened firmly to the bracket means, such that the sleeve means is retained between the foregoing opposed lateral walls under a fastening force given from the bolt, thereby fixedly securing the headrest stay to the bracket means.

Accordingly, any strong fastening of the bolts will be resisted by the sleeve means, which assures to prevent the stay against collapse and deformation. Further, the bolts are prevented from being cut or deformed by such headrest rotation problem as found in the prior art.

In another aspect of the invention, in light of the above-mentioned mode, the headrest arrangement may include a pair of through-bores so formed to penetrate through the stay in a direction orthogonal to a longitudinal axis of same; a pair of sleeve means having a flange formed at one end thereof, wherein another end portion of each sleeve means is inserted from one side of the stay to pass through those respective through-bores; and a support plate having two holes formed therein, which support plate is located at another side of the stay.

In such another mode, thus, the flange and support plate cooperate to provide a wider contact or abut area against the inner surfaces of the bracket means, and therefore, a great load applied to the stay can be dispersed or transmitted easily to the seat back of seat. Further, this effectively prevents the stay against rotation about its axis, which means to protect the bolt against the above-mentioned bolt cut or deformation problem.

DETAILED DESCRIPTION OF PREFERRED EMBODIMENTS OF THE INVENTION

Figure 1:
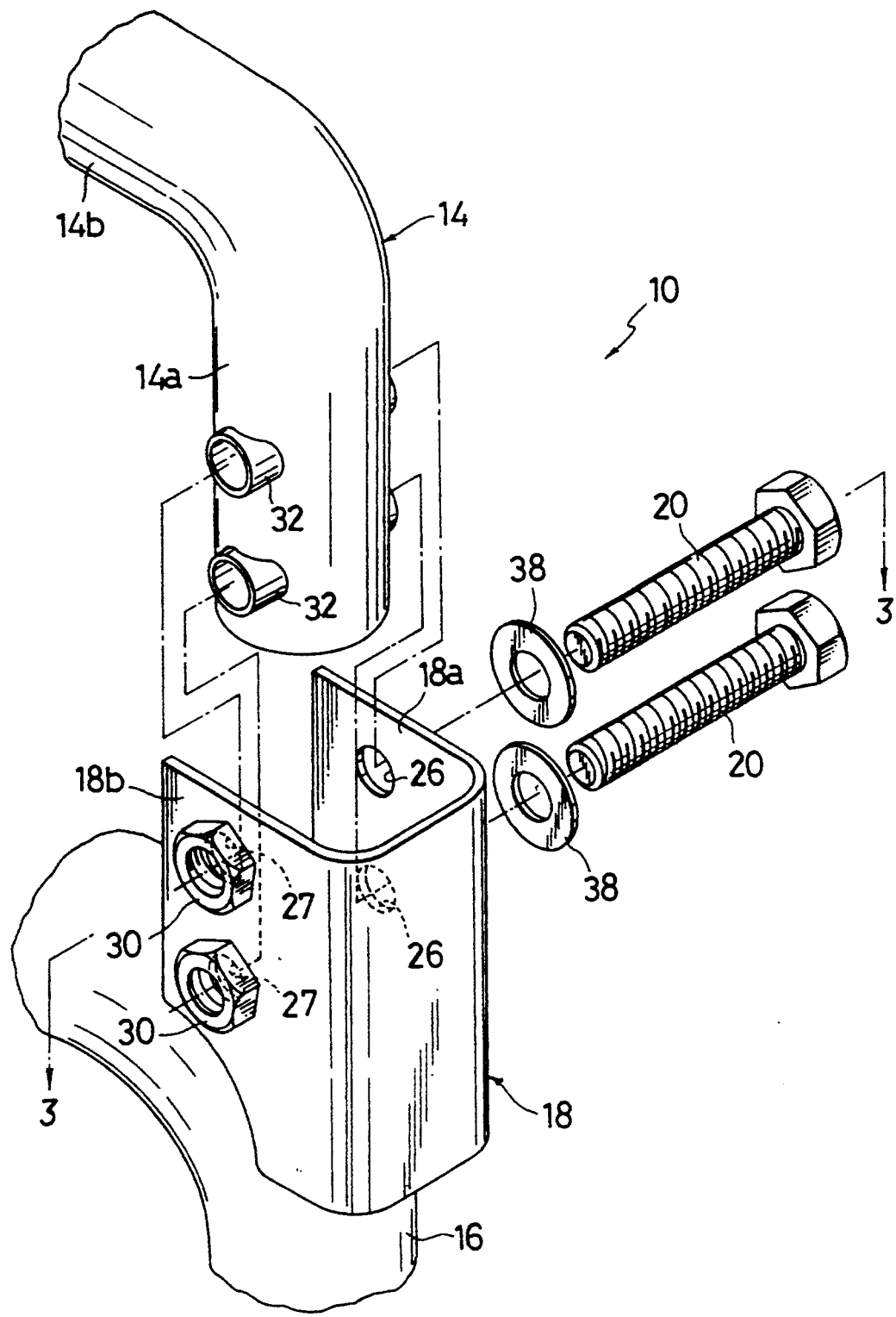
FIG. 1 is a partly broken and exploded perspective view of a principal portion of the headrest arrangement on a seat in accordance with the present invention.
Figure 2:
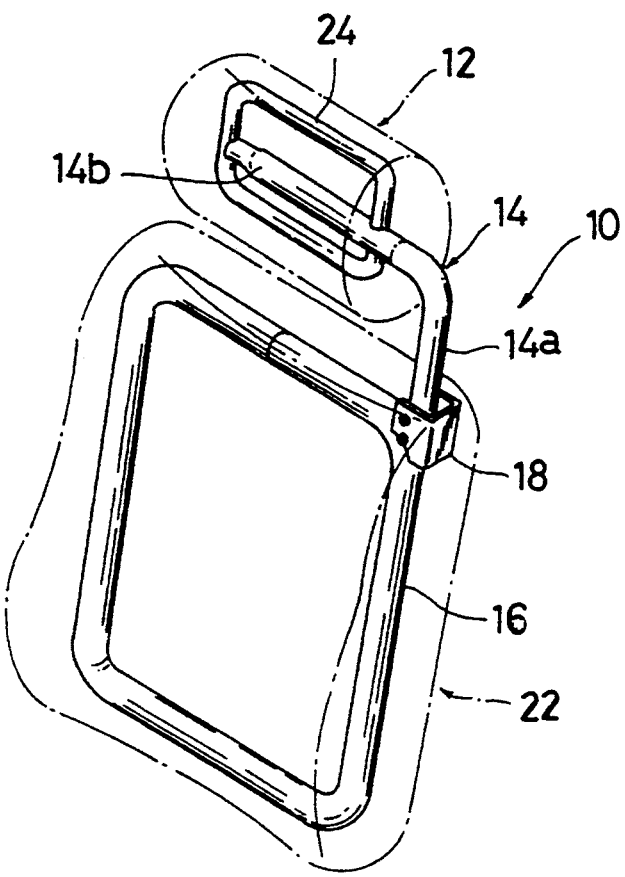
FIG. 2 is a schematic perspective view of a seat back and seat back frame to which the present invention is applied.
Figure 3:
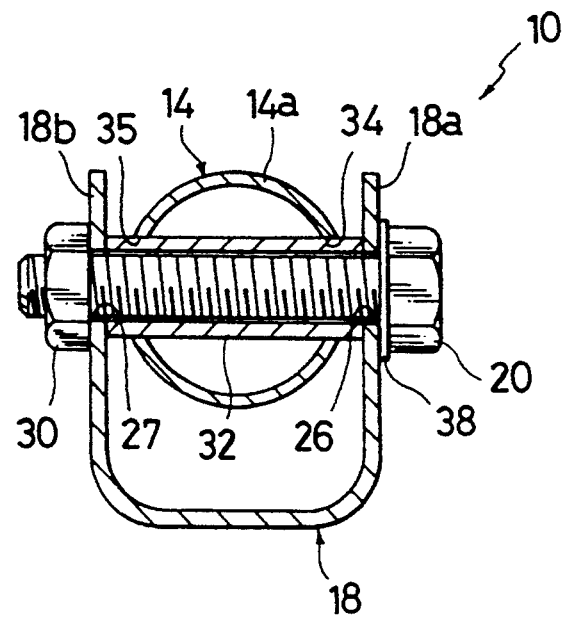
FIG. 3 is a sectional view taken along the line 3—3 in the FIG. 1.

Referring to FIGS. 1 to 3, there is illustrated a first embodiment of headrest arrangement on seat back as generally designated by (10) in accordance with the present invention.

As shown in FIG. 2, a headrest (12) has a base frame (24) embedded therein, which is shaped in a generally square form. The headrest (12) is formed by laying an elastic upholding member around the base frame (24) and covering them with a top surface member, in a known ordinary manner though not shown.

The stay (14) is formed into a generally L-shaped configuration by bending a tubular material having a circular cross-section, which comprises a horizontal stay section (14b) welded to the base frame (24) and a vertical stay section (14a) extending downwardly from the horizontal one (14b). Hence, as shown, the horizontal stay section (14b) extends from the right-side or left-side lateral wall of the headrest (12) to project a certain distance therefrom, and be continued with the vertical stay section (14a).

Designation (16) denotes a seat back frame (16) which is formed into a generally square shape by beinding a suitable tubular material. By covering a padding and top cover member over that seat back frame (16), a seat back (22) is formed, although not shown clearly, as in an ordinary conventional manner.

A bracket (18) is provided on the seat back frame (16). As best shown in FIGS. 1 and 3, the bracket (18) is formed to have a channel cross-section by bending a steel plate or the like accordingly, and is fixed by welding to the left-side corner of upper frame portion of the seat back frame (16). Hence, the bracket (18) is formed with a pair of opposed lateral wall sections (18a)(18b). The two lateral wall sections (18a)(18b) are in turn formed with a pair of holes (26)(26) and a pair of holes (27)(27), respectively. As best seen from FIG. 1, at the rightside lateral wall section (18b), there are fixed a pair of nuts (30)(30) by welding such that they are disposed in a coaxial alignment with the respective holes (27)(27) for threaded engagement with the respective two bolts (20)(20).

Referring now to FIGS. 1 and 3, in this particular embodiment, a pair of cylindrical sleeve members (32)(32) are debicted as passing through the respective through-bores (34)(35) which are formed in the lower part of the foregoing vertical stay section (14a) of headrest stay (14), such that the sleeve members (32)(32) extend in the diameter-wise direction of vertical stay section (14a) and their both ends project a slight distance from the opposite sides of the same stay section (14a). Of course, those two sleeve members are disposed such as to be aligned coaxially with and correspondingly to the respective paired holes (26,26)(27,27), in order that the two bolts (20)(20) may be inserted through the respective two sleeve members (32) and threadedly engaged into the respective nuts (30)(30). In this nature of construction, the inner diameters respectively of the sleeves (32)(32) should be slightly larger than each diameter of the holes (26)(27) in terms of allowing the bolts (20) to easily pass through both sleeves (32)(32) and also allowing both peripheral edges of sleeves (32) to abut against the inner walls of the bracket lateral sections (18a)(18b).

Thus, according to this first embodiment, in the assemblage, any strong fastening of the bolts (20) in the bracket (18) will be resisted by those two sleeves (32), and thereby, both stay vertical section (14a) and bracket lateral sections (18a, 18b) are positively prevented against collapse and deformation. In other words, normally since the bolts (20) are strongly fastened into the mating nuts (27), the contact between the sleeves and bracket becomes so firm that they cooperate to provide a more rigid effect in the diameter-wise direction of the stay vertical section (14a) and in a direction transversely of bracket lateral sections (18a, 18b). This also prevents the bolts (20) from being cut by the rotation force of the stay (14) about the axis of the stay vertical section (14a) as found in the prior art.

Figure 4:
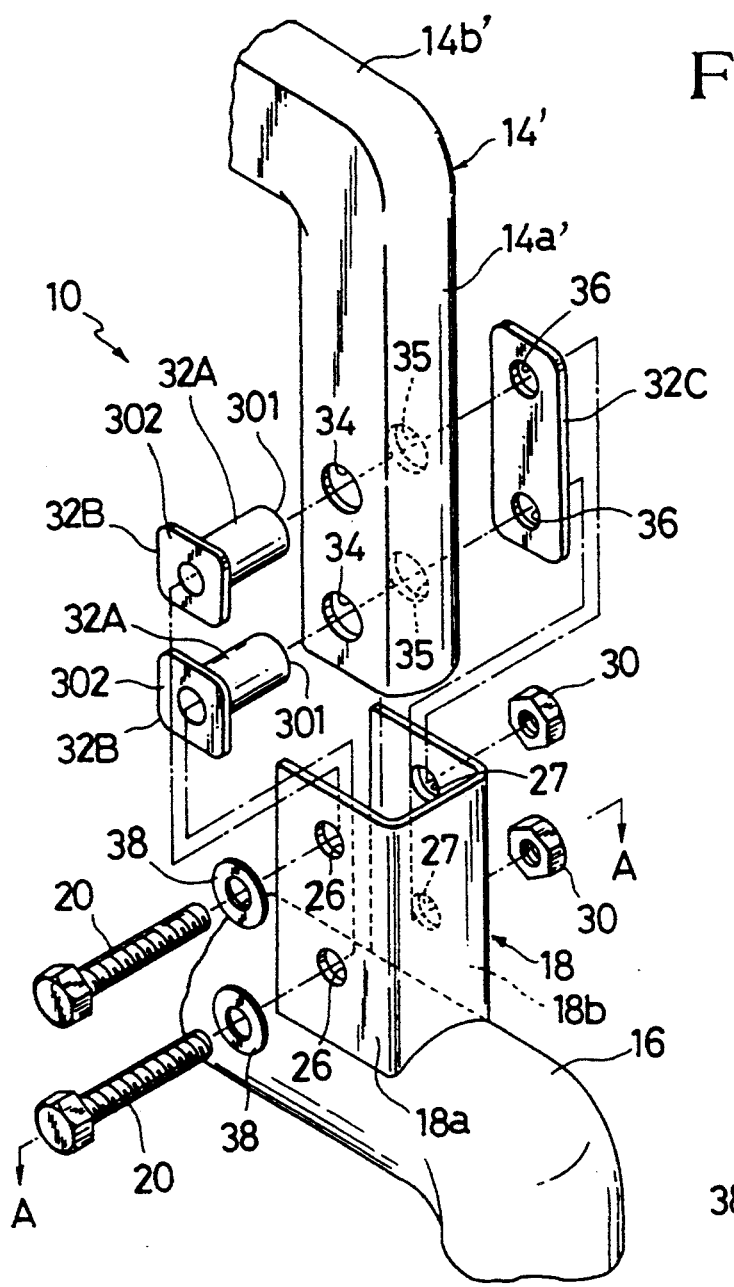
FIG. 4 is a partly broken and exploded perspective view of another embodiment of principal portion of the headrest arrangement on a seat in accordance with the present invention.
Figure 5:
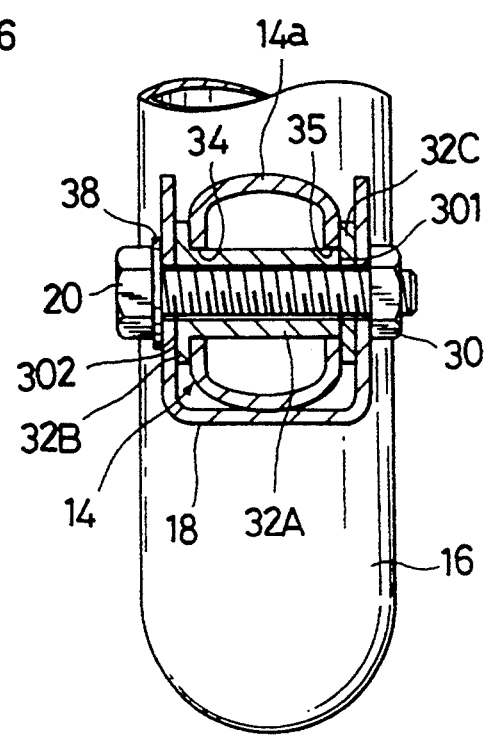
FIG. 5 is a sectional view taken along the line A—A in the FIG. 4.

FIGS. 4 and 5 show a second embodiment of the invention. In the present embodiment, the bracket (18) and bolts (20) are the same with those (i.e. 18, 20) of the above first embodiment, but the difference being that the stay (14') is so formed to have both flat lateral surfaces, and that there are provided a pair of cylindrical spacers (32A)(32A) each having a generally square-like flange (32B) formed at one end thereof, and a support plate (32C).

Namely, with regard to the stay (14'), in particular, its vertical stay section (14a') is formed at the lower end portion with a pair of spaced-apart holes (34) and another pair of spaced-apart holes (35). Precisely sated in this respect, those holes (34)(35) are formed on both flat lateral walls in such lower portion of vertical stay section (14a'), respectively. As can be seen from FIGS. 4 and 5, the two spacers (32A)(32A) pass through those holes (34)(35), respectively, such that the flanges (32B)(32B) are disposed between the left-side lateral wall (18a) of bracket (18) and the left-side flat lateral surface of stay vertical section (14a'). On the other hand, a support plate (32C) is disposed between the right-side lateral wall (18b) and rightside flat lateral surface of stay vertical section (14a'). The support plate is formed with a pair of spaced-apart holes (36)(36) each being so disposed as to be coaxially aligned with the two holes (35)(35) at the right-side flat surface of stay vertical section (14a'). As illustrated, the two bolts (20) (20) pass through the two spacers (32A)(32A), the two holes (36)(36) of support plate (32C), then the two holes (27)(27) at the left-side lateral section (18b) of bracket (18), and are finally threadedly engaged into the two nuts (30)(30) respectively.

Accordingly, as in FIG. 5, it is appreciated that, by virtue of the flanges (32B)(32B), the spacers (32A)(32A) are stably abuted against the inner wall of left-side lateral section (18a) of bracket (18), while at the same time, by virtue of the support plate (32C), the spacers are also, at their respective free ends (301)(301), stably abuted against the inner wall of right-side lateral section (18b) of same bracket (18). This is because, both flanges (32B) and support plate (32C) provides a wider contact area against both inner walls of right-side and left-side lateral sections (18a)(18b) of bracket (18). Thus, the strong fastening force given from the bolts (20) (20) are stably received or dispersed to those flanges (32B), spacers (32A) and support plate (32C), thereby preventing the deformation and collapse of the stay vertical section (14a') and bracket (18).

Further, importantly, in this second embodiment, the headrest stay (14') is formed at its frontal and rear sides with two opposed flat surface, respectively, as viewed from FIG. 4. This allows both flanges (32B) and support plate (32C) to evenly contact those two opposed surfaces, respectively, for complete dispersion or transmission of load down to the frame (16), assuring to prevent the bolts (20) from being deformed or cut with such stay rotation problem as stated previously in the prior art description.

Finally, this invention is not limited to the illustrated embodiments, but other replacements, modifications, and additions may be made thereto without departing from the scope and spirit of the appended claims.

What is claimed is:

1. An arrangement of a headrest on a seat, in which the seat includes a Seat back, and one single headrest stay extending from said headrest down to an upper end of a seat back, said headrest stay being formed from a tubular material, and said headrest is, via said stay, mounted on said seat back upper end, said arrangement comprising:

at least one sleeve means having two ends which is fixed in said headrest stay, such that said sleeve means passes through said stay in a diameter-wise direction thereof, the ends of the sleeve extending outwardly of said stay;

a bracket means having a generally U-shaped cross-section, which thus includes a pair of opposed lateral walls, said bracket means being fixed to said seat back;

at least one pair of holes, each being formed in the respective said pair of opposed lateral walls of said bracket means; and at least one bolt which is inserted through said sleeve means and pair of holes, and fastened firmly to said bracket means, such that said sleeve means is retained between said pair of opposed lateral walls of said bracket means under a fastening force given from said bolt, thereby fixedly securing said headrest stay to said bracket means.

2. The arrangement as defined in claim 1, wherein said headrest stay is of a circular shape in cross-section.

3. The arrangement as defined in claim 1, wherein said pair of opposed lateral wails of said bracket means are each formed with two pairs of said holes, thereby providing a first set of opposed two holes and a second set of opposed two holes between said pair of opposed lateral wails of said bracket means, wherein said sleeve means comprises a pair of sleeves, each being fixed in said stay such as to correspond to said first set of opposed two holes and to said second set of opposed two holes, respectively, wherein there are a pair of said bolts, each being inserted through the respective one of said pair of sleeves as well as the corresponding first and second sets of opposed two holes, and wherein said pair of bolts are firmly fastened to said bracket means, so that said pair of sleeves are retained between said pair of lateral walls of said bracket means by way of fastening forces given from said pair of bolts.

* * * * *